US008250014B2

(12) United States Patent
Schneegaβ et al.

(10) Patent No.: US 8,250,014 B2
(45) Date of Patent: Aug. 21, 2012

(54) METHOD FOR THE COMPUTER-AIDED LEARNING OF A CONTROL OR ADJUSTMENT OF A TECHNICAL SYSTEM USING A QUALITY FUNCTION AND TRAINING DATA

(75) Inventors: Daniel Schneegaβ, Amsterdamm (NL); Steffen Udluft, Eichenau (DE)

(73) Assignee: Siemens Aktiengesellshaft, München (DE)

( * ) Notice: Subject to any disclaimer, the term of this patent is extended or adjusted under 35 U.S.C. 154(b) by 732 days.

(21) Appl. No.: 12/386,638

(22) Filed: Apr. 21, 2009

(65) Prior Publication Data

US 2009/0271340 A1 Oct. 29, 2009

(30) Foreign Application Priority Data

Apr. 23, 2008 (DE) .......................... 10 2008 020 380

(51) Int. Cl.
*G06F 17/00* (2006.01)

(52) U.S. Cl. ....................................................... 706/45

(58) Field of Classification Search .................... 706/12, 706/15, 20, 45
See application file for complete search history.

(56) References Cited

U.S. PATENT DOCUMENTS

| | | | | |
|---|---|---|---|---|
| 7,490,071 | B2* | 2/2009 | Milenova et al. ................ | 706/45 |
| 2003/0144746 | A1* | 7/2003 | Hsiung et al. .................... | 700/28 |
| 2008/0233576 | A1* | 9/2008 | Weston et al. ..................... | 435/6 |
| 2010/0070098 | A1* | 3/2010 | Sterzing et al. ............... | 700/287 |
| 2010/0205974 | A1* | 8/2010 | Schneegass et al. ............ | 60/772 |
| 2010/0257866 | A1* | 10/2010 | Schneegass et al. ............ | 60/773 |
| 2011/0059427 | A1* | 3/2011 | Hans et al. ..................... | 434/322 |

FOREIGN PATENT DOCUMENTS

| | | |
|---|---|---|
| DE | 10222072 A1 | 11/2003 |
| DE | 103 33 181 A1 | 5/2005 |
| DE | 10345440 A1 | 5/2005 |
| DE | 69917711 T2 | 6/2005 |

OTHER PUBLICATIONS

Delage et al., "Percentile Optimization in Uncertain Markov Decision Processes with Application to Efficient Exploration", Proc. of the Internation Conference onMachine Learning, 2007, pp. 225-232, found on the Internet: http://www.machinelearning.org/proceedingsicm12007/papers/495.pdf [found on Sep. 23, 2010].
Tuttle et al., "Propagating Uncertainty in POMDP Value Iteration with Gaussian Processes", Nov. 30, 2004, pp. 1-11, found on the Internet on Sep. 21, 2010, URL: http://www.eprints.pascal-network.org/archive/00000800/01/gpvalittechrpt.pdf.

(Continued)

*Primary Examiner* — David Vincent (57) ABSTRACT

A method for the computer-aided learning of a control of a technical system is provided. An operation of the technical system is characterized by states which the technical system can assume during operation. Actions are executed during the operation and convert a relevant state into a subsequent state. The method is characterized in that, when learning the control, suitable consideration is given to the statistical uncertainty of the training data. This is achieved in that the statistical uncertainty of a quality function which models an optimal operation of the technical system is specified by an uncertainty propagation and is incorporated into an action selection rule when learning. By a correspondingly selectable certainty parameter, the learning method can be adapted to different application scenarios which vary in statistical requirements. The method can be used for learning the control of an operation of a turbine, in particular a gas turbine.

18 Claims, 2 Drawing Sheets

| | 0 | $\xi=0$ | $\xi=1/2$ | $\xi=1$ | $\xi=2$ | $\xi=3$ | $\xi=4$ | $\xi=5$ | |
|---|---|---|---|---|---|---|---|---|---|
| C | $10^4$ | 0,736 | 0,758 | 0,770 | 0,815 | 0,837 | 0,848 | 0,855 | |
| M | $10^4$ | 0,751 | 0,769 | 0,784 | 0,816 | 0,833 | 0,830 | 0,815 | L1 |
| F | $10^4$ | 0,767 | 0,785 | 0,800 | 0,826 | 0,837 | 0,840 | 0,839 | |
| C | $10^4$ | 0,720 | 0,767 | 0,814 | 0,848 | 0,851 | 0,854 | 0,854 | |
| M | $10^4$ | 0,713 | 0,731 | 0,749 | 0,777 | 0,787 | 0,780 | 0,771 | L2 |
| F | $10^4$ | 0,735 | 0,773 | 0,789 | 0,800 | 0,800 | 0,786 | 0,779 | |

OTHER PUBLICATIONS

Changjie Fan et al., "Bounded Incremental Real-Time Dynamic Programming", Frontiers in the Convergence of Bioscience and Information Technologies, Oct. 11, 2007, pp. 637-644, IEEE, Piscataway, NJ,USA.

Baohua Li et al.: "Approximate Robust Policy Iteration for Discounted Infinite-Horizon Markov Decision Processes with Uncertain Stationary Parametric Transition Matrices", Neural Networks, (Aug. 1, 2007), pp. 2052-2205, International Joint Conference, IEEE Piscataway, NJ, USA.

Schaefer et al., "A Neural Reinforcement Learning Approach to Gas Turbine Control", IEEE, In Proc. of the International Joint Conference on Neural Networks, 2007.

* cited by examiner

FIG 2

| | 0 | $\xi=0$ | $\xi=1/2$ | $\xi=1$ | $\xi=2$ | $\xi=3$ | $\xi=4$ | $\xi=5$ | |
|---|---|---|---|---|---|---|---|---|---|
| C | $10^4$ | 0,736 | 0,758 | 0,770 | 0,815 | 0,837 | 0,848 | 0,855 | ⎤ L1 |
| M | $10^4$ | 0,751 | 0,769 | 0,784 | 0,816 | 0,833 | 0,830 | 0,815 | |
| F | $10^4$ | 0,767 | 0,785 | 0,800 | 0,826 | 0,837 | 0,840 | 0,839 | ⎦ |
| C | $10^4$ | 0,720 | 0,767 | 0,814 | 0,848 | 0,851 | 0,854 | 0,854 | ⎤ L2 |
| M | $10^4$ | 0,713 | 0,731 | 0,749 | 0,777 | 0,787 | 0,780 | 0,771 | |
| F | $10^4$ | 0,735 | 0,773 | 0,789 | 0,800 | 0,800 | 0,786 | 0,779 | ⎦ |

METHOD FOR THE COMPUTER-AIDED LEARNING OF A CONTROL OR ADJUSTMENT OF A TECHNICAL SYSTEM USING A QUALITY FUNCTION AND TRAINING DATA

CROSS REFERENCE TO RELATED APPLICATIONS

This application claims priority of German application No. 10 2008 020 380.7 filed Apr. 23, 2008, which is incorporated by reference herein in its entirety.

FIELD OF THE INVENTION

The invention relates to a method for the computer-aided learning of a control and/or adjustment of a technical system as well as to a corresponding method for operating a technical system and a computer program product.

BACKGROUND OF THE INVENTION

Various methods are known from the prior art which, on the basis of previously determined training data representing the operation of a technical system, can be used to model an optimal operation of said system. In this case the technical system is described by states, actions and subsequent states, the states being specified technical parameters or observed state variables of the technical system, and the actions representing corresponding manipulated variables which can be varied in the technical system. General reinforcement learning methods which learn an optimal action selection rule for a technical system on the basis of training data in accordance with an optimality criterion are known from the prior art. The known methods have the disadvantage that they do not provide any information relating to the statistical uncertainty of a learned action selection rule. Such uncertainties are very significant, particularly if the quantity of training data is small.

SUMMARY OF THE INVENTION

The object of the invention is therefore to provide a method for learning the control and/or adjustment of a technical operation, which method takes into consideration the statistical uncertainty of the training data that is used when learning.

This object is achieved by the independent claims. Developments of the invention are defined in the dependent claims.

In the method according to the invention, a control or adjustment of a technical system is learned in a computer-aided manner, wherein the operation of the technical system is characterized by states which the technical system can assume during operation, and actions which are executed during the operation of the technical system and convert a relevant state of the technical system into a subsequent state. In the method according to the invention, a quality function and an action selection rule are learned on the basis of training data which comprises states, actions and subsequent states and is captured during the operation of the technical system, wherein the learning takes place in particular using a reinforcement learning method. In this case the quality function models an optimal operation of the technical system with regard to specific criteria for the technical system, and the action selection rule specifies the preferred action or actions to be executed for a relevant state of the technical system during operation of the technical system.

In the method according to the invention, during the learning of the quality function and the action selection rule, a measure for the statistical uncertainty of the quality function is determined by means of an uncertainty propagation and, depending on the measure for the statistical uncertainty and a certainty parameter which corresponds to a statistical minimum requirement for the quality function, a modified quality function is specified. A measure for the statistical uncertainty is understood to mean in particular a measure for the statistical variance or standard deviation, preferably the statistical variance or standard deviation itself. The invention combines a learning method with statistical uncertainty, wherein a measure for the statistical uncertainty of the quality function is determined on the basis of uncertainty propagation which is known per se and is also called Gaussian error propagation. The action selection rule is learned on the basis of the modified quality function which is derived therefrom.

The method according to the invention has the advantage that statistical uncertainty is taken into consideration, wherein various scenarios for operating the technical system can be set by means of a corresponding variation of the certainty parameter. In particular, the method produces a new action selection rule of optimal certainty which maximizes the performance of the technical system with reference to the statistical uncertainty.

In a preferred variant of the method according to the invention, the learning of the quality function and the action selection rule takes place with reference to evaluations and state-action probabilities. In this case a relevant evaluation evaluates the quality of a combination of state, action executed in the state and subsequent state, with regard to the optimal operation of the technical system, and is often called a reward. Depending on a state and the action executed in the state, a state-action probability specifies the probability of a subsequent state. In this case the state-action probabilities are preferably modeled as a state-action probability distribution and/or the evaluations are modeled as an evaluation probability distribution. In a variant of the method according to the invention the modeling of the state-action probability distribution or the evaluation probability distribution is done using relative frequencies from the training data. If evaluations are taken into consideration during the learning, such evaluations are contained in the training data or a function exists which outputs a corresponding evaluation depending on state, action and subsequent state.

Instead of the frequentist approach, which is based on relative frequencies for modeling a probability distribution, a further variant of the invention allows a Bayesian approach to be selected in which the state-action probability distribution and/or the evaluation probability distribution is estimated on the basis of an a-priori distribution using a-posteriori parameters, wherein the a-posteriori parameters depend on the training data. In particular, the Dirichlet distribution and/or a normal distribution can be used as an a-priori distribution.

In a particularly preferred embodiment, the known per se Bellman iteration is used for the learning of the quality function and the action selection rule. In the case of the known Bellman iteration, a new quality function is determined in each iteration step, wherein the invention now provides for a new measure for the statistical uncertainty of the quality function and hence a new modified quality function to be additionally specified in the relevant iteration step. In this case the specification of the new measure for the statistical uncertainty is effected in particular by means of determining, in each iteration step of the Bellman iteration, a covariance matrix which depends on the quality function that is specified in the iteration step, the state-action probabilities and the evaluations.

In a particularly preferred variant of the invention, the action selection rule that must be learned is a stochastic action selection rule which, for a state of the technical system, specifies a probability distribution for the executable actions. If the aforementioned Bellman iteration is used for learning, a probability distribution is determined in each iteration step as a new probability distribution for the executable actions, and modifies the probability distribution of the last iteration step in such a way that the action which maximizes the value of the modified quality function is assigned a higher probability.

In a further particularly preferred embodiment of the invention, on the basis of the certainty parameter, the method also provides the statistical minimum requirement for the quality function. Although it is known that the certainty parameter correlates with a statistical minimum requirement, this relationship is not explicitly specified. However, an embodiment of the invention makes it possible to calculate this relationship explicitly. In this case the statistical minimum requirement is preferably represented by a minimum quality function value and a probability value, wherein the probability value specifies the probability of the value of the quality function being greater or equal to the minimum quality function value. A Gaussian normal distribution for the quality function is preferably assumed for determining the statistical minimum requirement for the quality function.

The method according to the invention can be utilized for any technical systems. In a particularly preferred variant, the method is used for learning a control or adjustment of a turbine, in particular a gas turbine. The states of the gas turbine are e.g. the quantity of fuel supplied and/or the noise of the turbine in this case. Actions are e.g. the changing of the quantity of fuel supplied or a change in the settings of the turbine blades in this case.

In addition to the above described learning method, the invention further comprises a method for operating a technical system, wherein the technical system is operated on the basis of a control or adjustment which was learned using any chosen variant of the above described learning method. In this case the action to be executed is selected using the learned action selection rule in a relevant state of the technical system. In the case of a stochastic action selection rule, this is done e.g. by random selection of the actions according to the respective probability. In a preferred variant of this operation, the above learning method is repeated at intervals, wherein the states that have been newly assumed and the actions that have been newly executed by the technical system are taken into consideration as training data at each repetition.

In addition to the above described method, the invention further relates to a computer program product comprising a program code on a machine-readable medium for carrying out the method according to the invention when the program runs on a computer.

BRIEF DESCRIPTION OF THE DRAWINGS

Exemplary embodiments of the invention are described in detail below with reference to the attached figures, in which.

DETAILED DESCRIPTION OF THE INVENTION

The invention is explained below using the example of a technical system which is characterized by a state space S and an action space A. The state space represents a multiplicity of discrete or continuous states in the form of parameters of the technical system, wherein said parameters characterize the technical system during its operation. In the case of a gas turbine, these parameters can be the quantity of fuel supplied or the noise of the turbine, for example. The action space designates the possible actions which can be carried out in the technical system, wherein the states of the technical system can be changed by the actions. An action can be the changing of a manipulated variable of the technical system, e.g. a change in the position of stator blades of a gas turbine, a change in the fuel supply and the like.

The dynamics of the technical system are characterized in the embodiment described here as a Markov decision process by a transition probability distribution $P_T:S \times A \times S \rightarrow [0, 1]$, which depends on the current state of the technical system, the action which is carried out in the current state, and the resulting subsequent state of the technical system. In the embodiment described here of the method according to the invention, an action selection rule is learned in a computer-aided manner on the basis of training data, wherein an action selection rule specifies in general which action is preferably to be executed in a predetermined state of the technical system. The action selection rule can be deterministic in this context, i.e. a specific action is established by the rule, but it can also be stochastic, i.e. the action selection rule specifies a probability distribution of the actions to be executed on the basis of a state. The objective of the method according to the invention is the learning of a so-called action selection rule of optimal certainty, which is not necessarily optimal with regard to the expected performance, but satisfies a statistical minimum requirement for the action selection rule. In this way, it is possible to learn action selection rules which might not satisfy the optimality criterion of the maximum expected performance, but maximize a guaranteed performance.

A reinforcement learning method as per the prior art is initially explained below, the action selection rule being learned on the basis of the corresponding optimality criterion. In this case the optimality criterion is represented by a corresponding evaluation R, said evaluation specifying for a state, the action a which is performed in this state, and the subsequent state s', how desirable the performed action a is with regard to the optimal operation of the technical system. The optimal operation can be established as desired depending on the technical system concerned, criteria for such optimal operation being e.g. that no states occur which cause damage or destruction to the technical system, or that optimal efficiency be achieved during operation of the technical system. In the case of a gas turbine, the optimal operation could be specified e.g. in that a high level of efficiency is achieved without turbine noise occurring.

In the case of reinforcement learning of an optimal action selection rule, consideration is given to the expected discounted sum of future evaluations, which reads as follows:

$$V^\pi(s) = E_s^\pi \left( \sum_{i=0}^\infty \gamma^i R(s^{(i)}, \pi(s^{(i)}), s^{(i+1)}) \right)$$

This so-called value function must be maximized for all possible states s over the space of the action selection rules $\Pi \in (S \rightarrow A)$, where $0 < \gamma < 1$ is the discount factor, s' is the subsequent state of s, and $\pi \in \Pi$ is the action selection rule that is used. It also applies that $s=\{s', s'', \ldots, s^{(i)}, \ldots\}$. As an intermediate step, a so-called Q-function $Q^\pi(s,a)$ is constructed, which corresponds to an embodiment of the quality function within the meaning of claim 1. The Q-function depends on the current state of the technical system and the action which is selected in this state. The optimal quality function $Q^*=Q^{\pi^*}$ is specified as a solution of the so-called Bellman optimality equation, which reads as follows:

$$Q^*(s, a) = E_{s'}(R(s, a, s') + \gamma V^*(s'))$$
$$= E_{s'}\left(R(s, a, s') + \gamma \max_{a'} Q^*(s', a')\right)$$

With reference to the relevant optimality criterion, the best action selection rule is therefore established by:

$$\pi^*(s) = \arg\max_a Q^*(s,a)$$

The Bellman optimality equation is solved by the Bellman iteration which is sufficiently well known from the prior art and is explained in greater detail further below. T is defined below as the Bellman operator, which reads as follows for any desired quality function Q:

$$(TQ)(s,a) = E_{s'}(R(s,a,s') + \gamma \max_{a'} Q(s',a'))$$

In the subsequently described embodiment of the invention, consideration is also given to the statistical uncertainty which is derived from the uncertainties of the measurements in the technical system, said measurements being used as training data for specifying an action selection rule for the technical system.

These statistical uncertainties result in an uncertainty of the relevant Q-function and hence the learned action selection rule. The uncertainty which exists in the case of reinforcement learning is due to ignorance of the true behavior of the technical system, i.e. the true Markov decision process on which the technical system is based. The more observations about the technical system are present in the form of training data, the more information is available about the Markov decision process. The greater the stochasticity, the more uncertainty remains in relation to the Markov decision process for a predetermined number of observations.

The uncertainty of the measurements based on the training data, i.e. the uncertainty of the transitions from one state to the next by applying an action and the evaluation that is associated therewith, is propagated in the Q-function in the subsequently described variant of the invention, specifically by uncertainty propagation. The principle of uncertainty propagation, also designated as Gaussian propagation of uncertainties or Gaussian error propagation, is sufficiently well known from the prior art and is based on a Taylor development of first degree by the respective estimated point. In this case the uncertainty of the function values $f(x)$, where $f: \Re^m \to \Re^n$ and assuming predetermined uncertainty of the arguments x, is calculated on the basis of the following covariance:

$$\text{Cov}(f) = \text{Cov}(f,f) = D\text{Cov}(x)D^T$$

In this case $$D_{i,j} = \frac{\partial f_i}{\partial x_j}$$

signifies the Jacobi matrix of f according to its arguments x. $\text{Cov}(x) = \text{Cov}(x,x)$ designates the covariance of the arguments x, which in turn depends on the uncertainty of x. The function f has the symmetrical and positively definite covariance and uncertainty $\text{Cov}(f)$.

In the embodiment described here of the method according to the invention, the uncertainty that is present in the measurements is implemented in the reinforcement learning by means of the application of the Gaussian error propagation to the Bellman iteration.

The Bellman iteration for the m-th iteration step generally reads as follows:

$$Q^m(s_i, a_j) = (TQ^{m-1})(s_i, a_j)$$
$$= \sum_{k=1}^{|S|} P(s_k \mid s_i, a_j)(R(s_i, a_j, s_k) + \gamma V^{m-1}(s_k))$$

A discrete Markov decision process is considered in this context, but the invention can also be applied to non-discrete Markov decision processes. Actions having a maximum Q-value are sought for the purpose of determining the optimal action selection rule. It therefore applies that: $V^m(s) = Q^m(s,\pi(s))$, where $\pi$ represents the action selection rule that is used and $V^m(s) = \max_{a \in A} Q^m(s,a)$ applies. A finite number of states $s_i, i \in \{1, \ldots, |S|\}$ and actions $a_i, i \in \{1, \ldots, |A|\}$ are assumed in this context. The Bellman iteration converges for $m \to \infty$ to the optimal Q-function for the estimated state-action probability distribution P (corresponds to the transition probability distribution in a subsequent state assuming a given state and given action) and the evaluation probability distribution R. In the general stochastic case, in which $\pi$ represents a probability distribution of the executable actions $a_i$ in the state s, it applies that:

$$V^m(s) = \sum_{i=1}^{|A|} \pi(s, a_i) Q^m(s, a_i),$$

where $\pi(s,a)$ is the probability of the selection of the action a in the state s.

In order to implement an existing uncertainty in the Q-function at this stage, the technique of the uncertainty propagation or Gaussian error propagation is applied in parallel with the Bellman iteration as mentioned above. In the case of given covariance matrices $\text{Cov}(P)$, $\text{Cov}(R)$ and $\text{Cov}(P,R)$ for the transition probabilities P and the evaluations R, the following initial complete covariance matrix is produced:

$$\text{Cov}(Q^0, P, R) = \begin{pmatrix} 0 & 0 & 0 \\ 0 & \text{Cov}(P) & \text{Cov}(P, R) \\ 0 & \text{Cov}(P, R)^T & \text{Cov}(R) \end{pmatrix}$$

After the m-th Bellman iteration step, the complete covariance matrix based on the Gaussian error propagation reads as follows:

$$\text{Cov}(Q^m, P, R) = D^{m-1}\text{Cov}(Q^{m-1}, P, R)(D^{m-1})^T$$

In this context $D^m$ is the Jacobi matrix, which reads as follows:

$$D^m = \begin{pmatrix} D_{Q,Q}^m & D_{Q,P}^m & D_{Q,R}^m \\ 0 & I & 0 \\ 0 & 0 & I \end{pmatrix}$$

$$(D_{Q,Q}^m)_{(i,j),(k,l)} = \gamma \pi(s_k, a_l) P(s_k \mid s_i, a_j)$$

$$(D_{Q,P}^m)_{(i,j),(l,n,k)} = \delta_{il}\delta_{jn}(R(s_i, a_j, s_k) + \gamma V^m(s_k))$$

$$(D_{Q,R}^m)_{(i,j),(l,n,k)} = \delta_{il}\delta_{jn} P(s_k \mid s_i, a_j)$$

In this way the corresponding covariances between the Q-function, the transition probabilities P and the evaluations R are determined for each Bellman iteration step. In order to consider the uncertainty of the measurements in the technical system in a suitable manner at this stage it is necessary to stipulate a suitable initial covariance matrix Cov((P,R)). In the following, all transitions of different state-action pairs and their evaluations are assumed to be independent of each other, and therefore the transitions can be modeled as multinomial distributions. In one embodiment, a Bayesian approach to the modeling of the multinomial distributions is used. In this context an a-priori distribution $P(s_k|s_i,a_j)$ over the parameter space for predetermined i and j is assumed. In a particular embodiment, the Dirichlet distribution with the following density is used as the a-priori distribution:

$$P(P(s_1 \mid s_i, a_j), \ldots, P(s_{|S|} \mid s_i, a_j))_{\alpha_{1,i,j},\ldots,\alpha_{|S|,i,j}} =$$

$$\frac{\Gamma(\alpha_{i,j})}{\prod_{k=1}^{|S|} \Gamma(\alpha_{k,i,j})} \prod_{k=1}^{|S|} P(s_k \mid s_i, a_j)^{\alpha_{k,i,j}-1}$$

$$\alpha_{i,j} = \sum_{k=1}^{|S|} \alpha_{k,i,j}$$

is the so-called "conjugate prior" with the following a-posteriori parameters: $\alpha_{k,i,j}^d = \alpha_{k,i,j} + n_{s_k|s_i,a_j}$. In this case observed transitions from $s_i$ to $s_k$ as a result of performing the action $a_j$ are present according to the training data $n_{s_k|s_i,a_j}$. The initial covariance matrix for P then reads as follows:

$$(\mathrm{Cov}(P))_{(i,j,k),(l,m,n)} = \delta_{i,l}\delta_{j,m} \frac{\alpha_{k,i,j}^d(\delta_{k,n}\alpha_{i,j}^d - \alpha_{n,i,j}^d)}{(\alpha_{i,j}^d)^2(\alpha_{i,j}^d + 1)}$$

In this case the a-posteriori estimator $P(s_k|s_i,a_j)=\alpha_{k,i,j}^d/\alpha_{i,j}^d$ for the transition probabilities is taken as a starting point. In a similar manner the evaluations are assumed to be normally distributed with the normal gamma distribution as the conjugate prior.

Instead of determining the initial covariances on the basis of the Bayesian approach, the frequentist approach can also be used for determining the initial covariances. In the frequentist approach, P(s'|s,a) is modeled by the relative frequency of the observed transitions, i.e.

$$P(s_k \mid s_i, a_j) = \frac{n_{s_k|s_i,a_j}}{n_{s_i,a_j}}$$

applies.

The covariances are then derived as follows:

$$(\mathrm{Cov}(P))_{(i,j,k),(l,m,n)} = \delta_{i,l}\delta_{j,m} \frac{P(s_k \mid s_i, a_j)(\delta_{k,n} - P(s_n \mid s_i, a_j))}{n_{s_i,a_j} - 1}$$

In this case the Poisson approximation represents an essential simplification, since $\mathrm{Cov}(P(\cdot|s_i,a_j))$ becomes a diagonal matrix thus. The Poisson approximation consists of the following estimation:

$$(\mathrm{Cov}(P))_{(i,j,k),(l,m,n)} = \delta_{i,l}\delta_{j,m}\delta_{k,n} \frac{P(s_k \mid s_i, a_j)}{n_{s_i,a_j} - 1}$$

This approximation can be of interest for large state spaces, for example, since the uncertainty propagation can run significantly faster.

For the purpose of modeling the evaluations, it is assumed in the case of the frequentist approach that the evaluations of various transitions which start from the same state-action pair are statistically independent of each other. The frequentist approximation then consists of the average observed evaluation, wherein Cov(R) becomes a diagonal matrix and takes the following form:

$$\mathrm{Cov}(R(s_i, a_j, s_k)) = \frac{\mathrm{var}(R(s_i, a_j, s_k))}{n_{s_k|s_i,a_j} - 1}$$

The frequentist approach and the Bayesian approach using a conjugate prior have the advantage that they are suitable for processing in a computer-aided manner. However, the method according to the invention is not restricted to these approaches and any meaningful covariance matrix Cov((P, R)) is allowed. In particular, the use of covariances between the transitions beginning with different state-action pairs and between states and evaluations can be effective and meaningful if there is a measure for a neighborhood in the state-action space.

It can now be demonstrated, for a finite Markov decision process M=(S,A,P,R) with a discount factor $0<\gamma<1$ and $C^0$ as any initial symmetrical and positively definite covariance matrix, that the function:

$$(Q^m, C^m) = (TQ^{m-1}, D^{m-1}C^{m-1}(D^{m-1})^T)$$

produces a single fixed point (Q*,C*), almost always independently of the initial Q, for the Bellman iteration.

If the fixed point of the Bellman iteration has therefore been obtained, i.e. the converged Q-function Q*, a fixed point is also produced for the covariance, which is given by Cov (Q*). The uncertainty of the Q-function Q* determined by the Bellman iteration is now specified by the diagonal entries of the covariance matrix, since the diagonal represents the variances of the Q-values. The following uncertainty is therefore specified for Q*:

$$\sigma Q^* = \sqrt{\mathrm{diag}(\mathrm{Cov}(Q^*))}$$

The invention provides for a settable certainty parameter ξ, which represents a statistical minimum requirement for the Q-function depending on the application. On the basis of this parameter $\xi$, which represents a probability depending on the distribution of Q, the following modified Q-function is now examined:

$$Q_u^*(s,a) = (Q^* - \xi \sigma Q^*)(s,a)$$

This Q-function represents an important result of the method according to the invention. It delivers the guaranteed expected performance when executing the action $a_j$ in the state $s_i$, if the action selection rule $\pi^*(s) = \arg\max_a Q^*(s,a)$ is strictly followed. Assuming a normal distribution of Q, a selection of $\xi=2$ produces a guaranteed performance $Q_u^*$ with a probability of P(2)=0.977. This means that there is a probability of 97.7% that the Q-function assumes a value which is at least as big as the value of the Q-function in the normal distribution at the position which is two standard deviations smaller than the expectation value $Q^*$.

Figure 1:
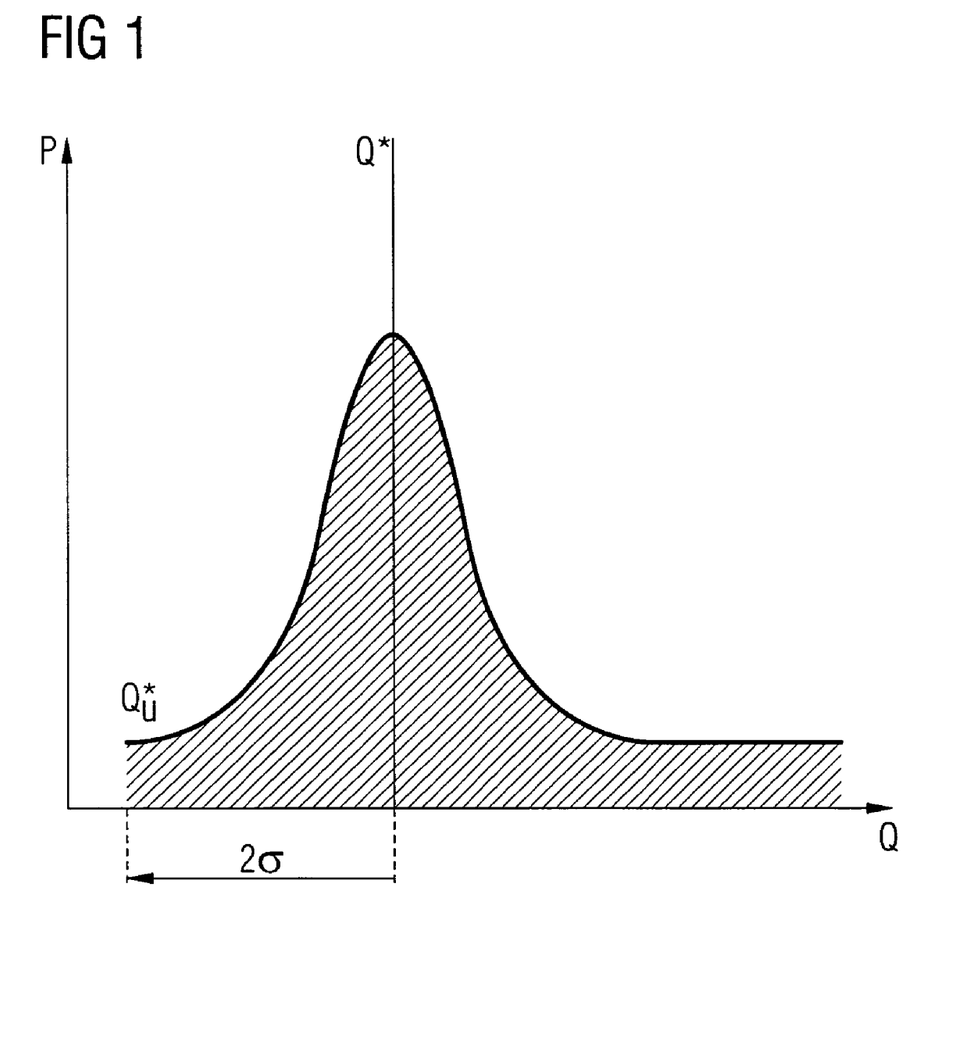
FIG. 1 shows a diagram which illustrates the significance of the certainty parameter for a Q-function in an embodiment of the invention.

An assumed normal distribution for the Q-function is represented by way of example in FIG. 1. FIG. 1 shows a value of $\xi$ which is equivalent to twice the standard deviation $\sigma$ of the distribution. The value $Q_u^*$ two standard deviations to the left of the expectation value $Q^*$ then corresponds to the guaranteed performance, i.e. there is a probability of P=0.977, this being indicated by the hatched area in FIG. 1, that the value of the quality function is greater than or equal to $Q_u^*$. By changing the parameter $\xi$ it is therefore possible to vary the guaranteed minimum performance. By modifying the Q-function using the parameter $\xi$ it is now possible to specify a suitable action selection rule of optimal certainty, which maximizes the guaranteed performance.

The action selection rule is therefore sought which maximizes the guaranteed performance Z(s,a) with reference to a previously specified confidence level P($\xi$). In other words, an action selection rule $\pi$ is sought such that Z is maximized and it holds that:

$$\forall s,a : P(\overline{Q}^\pi(s,a) > Z(s,a)) > P(\xi)$$

In this case $\overline{Q}^\pi$ designates the true performance function of $\pi$ and P($\xi$) represents a predetermined probability based on the certainty parameter $\xi$. According to the invention, such a solution can be achieved by an approximation of Z by $Q_u^\pi$ and by solving the following relation $$\pi^\xi(s) = \arg\max_\pi \max_a Q_u^\pi(s,a) = \arg\max_\pi \max_a (Q^\pi - \xi \sigma Q \pi)(s,a)$$

on condition that $Q^{\pi^\xi} = Q^\xi$ is a valid Q-function of $\pi^\xi$, i.e. provided it holds that:

$$\forall i, j : Q^\xi(s_i, a_j) = \sum_{k=1}^{|S|} P(s_k | s_i, a_j)(R(s_i, a_j, s_k) + \gamma Q^\xi(s_k, \pi^\xi(s_k)))$$

With reference to the Bellman iteration, Q should therefore be a fixed point, not in relation to the value function as a maximum of all possible Q-values, but as a maximum of the Q-values minus their weighted uncertainty. Consequently, the action selection rule in each iteration step is selected as:

$$\pi^m(s) = \arg\max_{a'}(Q^m - \xi \sigma Q^m)(s, a'),$$

and specifically together with an update of the uncertainties relating to $\pi^m$ by application of the uncertainty propagation. In this way an entangled iteration derived from the Bellman iteration and uncertainty propagation is generated.

For the purpose of specifying the action selection rule $\pi^m$ it must be taken into consideration that the action selection rule can be deterministic or stochastic. It can be demonstrated that the optimal action selection rule, which maximizes the Q-function, is always deterministic for Markov decision processes. However, this is not always the case for the above the above action selection rule of optimal certainty. In particular for $\xi>0$, a bias exists in favor of the level of $\xi \sigma Q(s,\pi(s))$ in comparison with $\xi \sigma Q(s,a), a \neq \pi(s)$, if $\pi$ is the specified action selection, since the evaluation $R(s,\pi(s),s')$ is more heavily dependent on $V(s') = Q(s',\pi(s'))$ than $R(s,a,s'), a \neq \pi(s)$. The value function implies the selection of an action for all future occurring states s. Therefore a convergence is not ensured when a deterministic action selection rule is used. This means that a change in the action selection rule $\pi$ to $\pi'$ with $Q(s,\pi'(s)) - \xi \sigma Q(s,\pi'(s)) > Q(s,\pi(s)) - \xi \sigma Q(s,\pi(s))$ could result in a greater uncertainty of $\pi'$ for the state s, which would produce $Q'(s\pi'(s)) - \xi \sigma Q'(s,\pi'(s)) < Q'(s,\pi(s)) - \xi \sigma Q'(s,\pi(s))$ for Q' in the next iteration step. This causes an oscillation which can be can be avoided by using a stochastic action selection rule.

It can be seen intuitively that an action selection rule of optimal certainty must generally be stochastic, since the gain in performance and its uncertainty must be equalized. The risk of a bad action selection rule is finally also reduced in that the action selection rule is scattered over an amount of suitable actions. The certainty parameter $\xi$ ultimately decides the cost of the certainty. If $\xi>0$ is large, then the action selection rule of optimal certainty is more likely to be stochastic, but the certainty gain achieved thereby results in a lower performance, while a $\xi \leq 0$ guarantees deterministic action selection rules of optimal certainty. However, these are less certain in relation to the performance, but have a greater chance of achieving better performance. In the embodiment described here, the stochastic uncertainty is implemented as a stochastic action selection rule in the Bellman iteration as follows:

$$\begin{pmatrix} Q^m \\ C^m \\ \pi^m \end{pmatrix} = \begin{pmatrix} TQ^{m-1} \\ D_{m-1} C^{m-1} D_{m-1}^T \\ \Lambda(\pi^{m-1}, TQ^{m-1}, m) \end{pmatrix},$$

where $$\Lambda(\pi, Q, t)(s, a) = \begin{cases} \min\left(\pi(s,a) + \dfrac{1}{t}, 1\right): & a = a_Q(s) \\[6pt] \dfrac{\max\left(1 - \pi(s, a_Q(s)) - \dfrac{1}{t}, 0\right)}{1 - \pi(s, a_Q(s))} \pi(s,a): & \text{sonst} \end{cases}$$

and $a_Q(s) = \arg\max_a(Q - \xi \sigma Q)(s, a)$. The harmonically reduced rate for changing the action selection probabilities guarantees both the achievability of each stochastic action selection rule and the convergence.

The above-described learning of the Q-function and of the action selection rule is summarized again in the following:

Initialization: Estimates for the transition probabilities P and the evaluations R, as well as initial covariance matrices Cov(P), Cov(R) and Cov(P,R), are specified on the basis of the training data. In addition, a certainty parameter $\xi$ is established.

The following calculation of the Q-function of optimal certainty and of the action selection rule $\pi$ is performed assuming the observations and the a-posteriori parameters provided by Cov(P), Cov(R) and Cov(P,R):

$$\text{Set } C = \begin{pmatrix} 0 & 0 & 0 \\ 0 & \text{Cov}(P) & \text{Cov}(P,R) \\ 0 & \text{Cov}(P,R)^T & \text{Cov}(R) \end{pmatrix}$$

$$\text{set } \forall i,j: Q(s_i, a_j) = 0, \forall i,j: \pi(s_i, a_j) = \frac{1}{|A|}, t = 0$$

Repeat the following loop until the desired precision is achieved:

set $t = t + 1$ set $\forall i, j: (\sigma Q)(s_i, a_j) = \sqrt{C_{i|A|+j, i|A|+j}}$ find $\forall i: a_{i,\max} = \text{argmax}_{a_j}(Q - \xi \sigma Q)(s_i, a_j)$ set $\forall i: d_{i,\text{diff}} = \min\left(\frac{1}{t}, 1 - \pi(s_i, a_{i,\max})\right)$ set $\forall i: \pi(s_i, a_{i,\max}) = \pi(s_i, a_{i,\max}) + d_{i,\text{diff}}$ set $\forall i: \forall a_j \neq a_{i,\max}: \pi(s_i, a_j) = \frac{1 - \pi(s_i, a_{i,\max})}{1 - \pi(s, a_{i,\max}) + d_{i,\text{diff}}} \pi(s_i, a_j)$ set $\forall i$, $$j: Q'(s_i, a_j) = \sum_{k=1}^{|S|} P(s_k | s_i, a_j)\left(R(s_i, a_j, s_k) + \gamma \sum_{l=1}^{|A|} \pi(s_k, a_l) Q(s_k, a_l)\right)$$

set $Q = Q'$ $$\text{set } D = \begin{pmatrix} D_{Q,Q} & D_{Q,P} & D_{Q,R} \\ 0 & I & 0 \\ 0 & 0 & I \end{pmatrix}$$

set $C = DCD^T$

End of loop return: $Q - \xi \sigma Q$ and $\pi$

The time complexity of the above method is greater than for the standard Bellman iteration, which is $O(|S|^2|A|)$ for discrete Markov decision processes. The most costly process is that of updating the covariance matrix with a time complexity between $\Omega((|S||A|)^2 \log((|S||A|)))$ and $O((|S||A|)^{2.376})$, since each entry of Q depends on at most $\Omega(|S|)$ entries in P and R. However, the time complexity overall therefore remains limited by these dimensions. If one considers the number of actions as being limited by a constant, then the method described here is slower than the standard Bellman iteration at least by $\Omega(\log(|S|))$ but at most by $O(|S|^{0.376})$.

The function $Q_u^\xi(s_i, a_j) = (Q^\xi - \xi \sigma Q^\xi)(s_i, a_j)$ with $(Q^\xi, C^\xi, \pi^\xi)$ as the fixed point of the stochastic entangled Bellman iteration for a given certainty parameter $\xi \in \mathfrak{R}$ delivers the guaranteed expected performance (with a probability $P(\xi)$) in the states $s_i$ when applying the actions $a_j$ and subject to the a-posteriori assumptions, which are derived from the a-priori assumptions and the observations, if the stochastic action selection rule $\pi^\xi$ is followed after the action $a_j$. In particular, this performance is maximal for the special selection of the certainty parameter $\xi$.

The inventive method has been described above for the discrete case, i.e. for Markov decision processes with finite state spaces. However, the method can easily be applied to other applications, in which the states or actions are continuous and the state space or action space is not limited.

Using the method described above, various types of control or adjustment scenarios can be realized for a technical system depending on the application concerned.

One application is quality assurance by means of uncertainty propagation. Using a positive $\xi$, a guaranteed minimum performance is determined for a given action selection rule or the optimal action selection rule. Furthermore, the concept of optimal certainty allows this minimum performance to be optimized. The primary motivation is that, using the method according to the invention, no low-quality action selection rules are generated and the risk of obtaining an unsuitable action selection rule despite the appearance of good performance is reduced. In particular, access to a specific quantization of the uncertainty makes it possible to judge the trustworthiness of the result. If the guaranteed performance at a specified starting state is inadequate, further observations in the form of training data must be collected from the technical system.

If the exploration is costly, but the controlled technical system is certainty-critical and therefore a certain performance probability must definitively be satisfied, then it is beneficial to make use of the concept of optimal certainty. The optimality of the expected value is abandoned in favor of the optimality to a specified percentile (i.e. to a specific percentage of possible improved Q-values).

A second example is the symmetrical case of competitions and explorations. In this case, for a negative $\xi$, the uncertainty is used in the opposite way by exploiting the chance of a high performance. This is of particular interest for target-oriented exploration, such that state-action pairs are explored to a greater extent, for which $Q_u^\xi(s,a)$ is large because the estimator is already large for the corresponding Q-value, but the true performance could still be considerably better.

A further field of application relates to competition situations which can be described exactly symmetrically for quality assurance. In this case an action selection rule should be followed which offers the chance of performing exceptionally well and ultimately winning the competition. The concept of optimal certainty is relevant again in this case, since it is not the expected performance but the percentile performance that is the deciding criterion and should be maximized.

A further application is the increase of the information efficiency in practical applications. In addition to quality assurance, a primary aim of the method described here is the improvement of the information efficiency. The consideration of uncertainties can, in the case of reinforcement learning methods, even improve the expected performance of real Markov decision processes in many practical and industrial applications, in which exploration is expensive and is only possible to a limited extent at designated work points. The available data set is therefore limited and the exploration takes place in a manner which is extremely asymmetric in some cases, such that data is only collected in state areas for which operation already takes place by preference within the technical system. Many of these inadequately explored so-called marginal states are admittedly unwanted in the expectation value, but not necessarily in the individual case. If the margin is sufficiently large, then it occurs at least on some occasions that one of the outliers simulates a high evaluation. It should be noted that the size of the margin region increases with the dimensionality of the state space. A prudent consideration of the uncertainty therefore causes the method to ignore such outliers in its action selection rule and to execute actions which reliably result in a high performance.

The above embodiment of the method according to the invention was applied to a gas turbine control with a continuous state space and a finite set of actions. The internal state space was applied depending on three precisions, specifically the precision C=coarse (corresponds to 256 states), the precision M=medium (corresponds to 625 states) and the precision F=fine (corresponds to 1296 states). In this case the high-dimensional state space was reduced to an approximated four-dimensional Markov state space. An exact description of the problem and the structure of the minimum Markov state space can be found in the publication [1].

Figure 2:
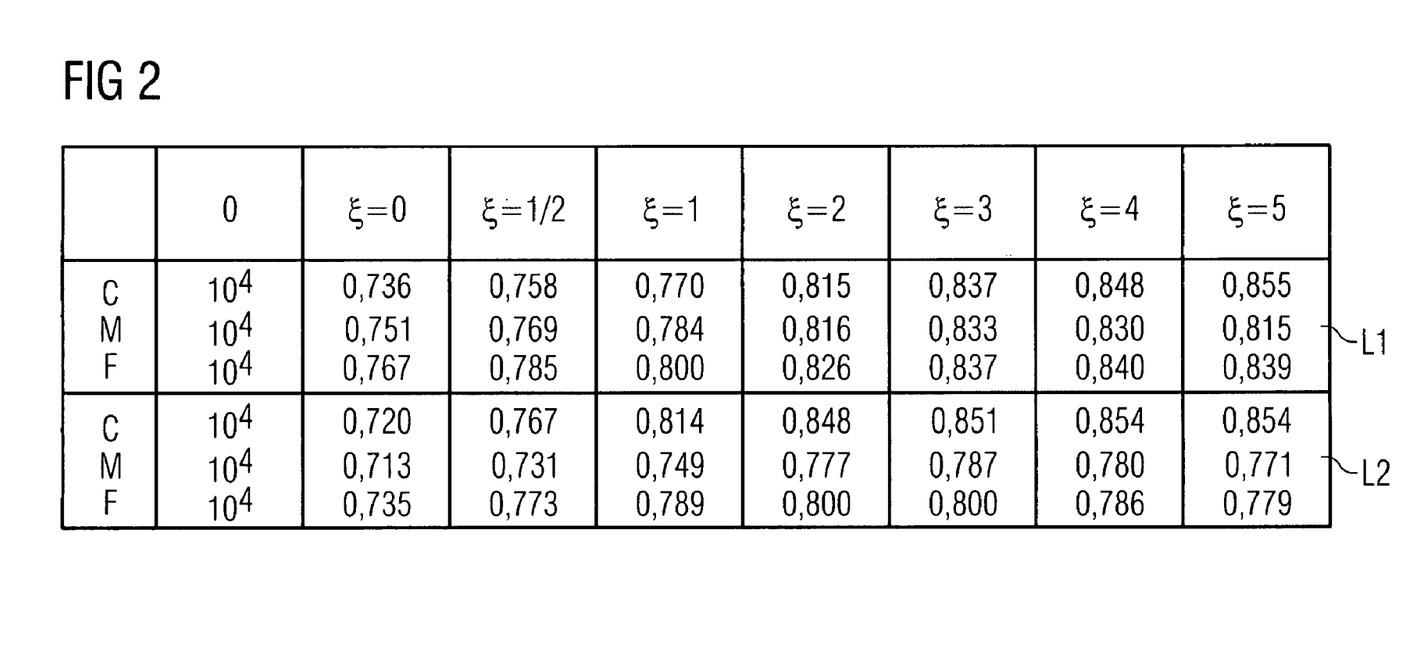
FIG. 2 shows a table indicating results of an embodiment of the method according to the invention for the example of a gas turbine.

The performances that were determined (50 runs with short random episodes which begin at different operating points) are shown in the table according to FIG. 2 as averaged evaluations. In this case a frequentist modeling of the transition probabilities was used in the row L1, while a Bayesian modeling was used in the row L2. The evaluations were estimated using a uniformed normal gamma distribution as the conjugate prior, where $\sigma=\infty$ and $\alpha=\beta=0$. The results for the coarse discretization C, the medium discretization M and the fine discretization F are found in the respective rows L1 and L2. The number of observations, which is always $10^4$, is specified in the column O. The columns to the right of the column O show the average performances in the form of the averaged evaluations for different values of the certainty parameter $\xi$, where $\xi=0$ corresponds to the classical specification of the action selection rule according to the standard Bellman iteration. The performance is highest using the coarse discretization C. Averaged over all discretizations, the result of the frequentist approach is better than that of the Bayesian approach. The best performance overall is achieved using the coarse discretization C of the frequentist approach with $\xi=5$, but the Bayesian approach gives comparable results with $\xi=3$. In particular, it can be seen from FIG. 2 that the performance achieved using the inventive method (i.e. $\xi\neq0$) is better than the performance achieved using the conventional method ($\xi=0$)

REFERENCES

[1] Anton Maximilian Schaefer, Daniel Schneegass, Volkmar Sterzing and Steffen Udluft: A neural reinforcement learning approach to gas turbine control. In Proc. of the International Joint Conference on Neural Networks, 2007.

The invention claimed is:

1. A method for a computer-aided learning of a control of a technical system, comprising:
characterizing an operation of the technical system by a state;
executing an action during the operation for converting the state into a subsequent state;
generating a training data comprising the state, the action and the subsequent state;
modeling an optimal operation of the technical system by a quality function;
learning the quality function based on the training data;
determining a measure for a statistical uncertainty of the quality function by an uncertainty propagation;
defining a modified quality function depending on the measure and a certainty parameter corresponding to a statistical minimum requirement for the quality function;
specifying the action by an action selection rule; and
learning the action selection rule based on the modified quality function.

2. The method as claimed in claim 1, wherein the action selection rule is a stochastic action selection rule specifying a probability distribution for the action.

3. The method as claimed in claim 2, wherein:
the quality function is learned with reference to an evaluation and a state-action probability,
the evaluation evaluates a quality of a combination of the state, the action and the subsequent state, and
the state-action probability specifies a probability of the subsequent state.

4. The method as claimed in claim 3, wherein:
the state-action probability is modeled as a state-action probability distribution, and
the evaluation is modeled as an evaluation probability distribution.

5. The method as claimed in claim 4, wherein the state-action probability distribution and the evaluation probability distribution are modeled as relative frequencies from the training data.

6. The method as claimed in claim 4, wherein the state-action probability distribution and the evaluation probability distribution are estimated based on a priori distribution with a posteriori parameter being dependent on the training data.

7. The method as claimed in claim 6, wherein the priori distribution is a Dirichlet distribution or a normal distribution.

8. The method as claimed in claim 3, wherein:
the quality function and the action selection rule are learned based on a Bellman iteration, and
a new quality function and a new measure for the statistical uncertainty of the quality function and a new modified quality function are specified in each iteration step.

9. The method as claimed in claim 8, wherein a covariance matrix is determined as a function of the quality function, the state-action probability and the evaluation in each iteration step of the Bellman iteration for specifying the new measure for the statistical uncertainty.

10. The method as claimed in claim 8, wherein the probability distribution of a preceding iteration step is modified in each iteration step of the Bellman iteration so that the action that maximizes a value of the modified quality function is assigned a higher probability.

11. The method as claimed in claim 1, wherein the statistical minimum requirement for the quality function is determined based on the certainty parameter.

12. The method as claimed in claim 1, wherein:
the statistical minimum requirement for the quality function is represented by a minimum value of the quality function and a probability value, and
the probability value specifies a probability of a value of the quality function that is greater than or equal to the minimum value of the quality function.

13. The method as claimed in claim 1, wherein the statistical minimum requirement for the quality function is determined by a Gaussian distribution.

14. The method as claimed in claim 1, wherein the technical system is a turbine.

15. The method as claimed in claim 14, wherein the turbine is a gas turbine.

16. A method for operating a technical system, comprising:
characterizing an operation of the technical system by a state;
executing an action during the operation for converting the state into a subsequent state;
generating a training data comprising the state, the action and the subsequent state;
modeling an optimal operation of the technical system by a quality function;
learning the quality function based on the training data;
determining a measure for a statistical uncertainty of the quality function by an uncertainty propagation;

defining a modified quality function depending on the measure and a certainty parameter corresponding to a statistical minimum requirement for the quality function;
specifying the action by an action selection rule;
learning the action selection rule based on the modified quality function; and
selecting the action using the learned action selection rule.

17. The method as claimed in claim 16, wherein the steps of the method are iteratively performed and the training data comprises a new state and a new action generated in each step of the iteration.

18. A computer program product executable in a computer for operating a technical system, comprising:
a program code that executes steps of:
characterizing an operation of the technical system by a state;
executing an action during the operation for converting the state into a subsequent state;
generating a training data comprising the state, the action and the subsequent state;
modeling an optimal operation of the technical system by a quality function;
learning the quality function based on the training data;
determining a measure for a statistical uncertainty of the quality function by an uncertainty propagation;
defining a modified quality function depending on the measure and a certainty parameter corresponding to a statistical minimum requirement for the quality function;
specifying the action by an action selection rule;
learning the action selection rule based on the modified quality function; and
selecting the action using the learned action selection rule.

* * * * *